US008566703B2

(12) United States Patent
Aoki

(10) Patent No.: US 8,566,703 B2
(45) Date of Patent: Oct. 22, 2013

(54) PAGE DESCRIPTION DATA PROCESSING APPARATUS, PAGE DESCRIPTION DATA PROCESSING METHOD, AND RECORDING MEDIUM

(75) Inventor: Yasuharu Aoki, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/954,300

(22) Filed: Nov. 24, 2010

(65) Prior Publication Data

US 2011/0131483 A1  Jun. 2, 2011

(30) Foreign Application Priority Data

Nov. 27, 2009  (JP) ................................ 2009-270710

(51) Int. Cl.
*G06F 17/00* (2006.01)
(52) U.S. Cl.
USPC ........................... 715/234; 715/230; 715/249
(58) Field of Classification Search
USPC .......................................... 715/234, 230, 249
See application file for complete search history.

(56) References Cited

U.S. PATENT DOCUMENTS

| 5,500,927 | A | * | 3/1996 | Sander-Cederlof et al. ... | 345/442 |
|---|---|---|---|---|---|
| 5,611,036 | A | | 3/1997 | Berend et al. | |
| 5,636,337 | A | * | 6/1997 | Boenke et al. ................ | 345/629 |
| 5,731,820 | A | * | 3/1998 | Broekhuijsen ................ | 345/442 |
| 7,069,314 | B1 | * | 6/2006 | Aoki et al. .................... | 709/224 |
| 2003/0001864 | A1 | * | 1/2003 | Charpentier .................. | 345/619 |
| 2003/0107849 | A1 | * | 6/2003 | Ikarashi ..................... | 360/324.1 |
| 2004/0036917 | A1 | * | 2/2004 | Sano ............................ | 358/1.18 |
| 2004/0083430 | A1 | * | 4/2004 | Boonen ........................ | 715/523 |
| 2004/0105128 | A1 | * | 6/2004 | Sano ............................ | 358/1.18 |
| 2005/0162692 | A1 | * | 7/2005 | Sano et al. .................... | 358/1.15 |
| 2006/0164701 | A1 | * | 7/2006 | Aoki et al. .................... | 358/518 |
| 2006/0262960 | A1 | * | 11/2006 | Le Clerc et al. .............. | 382/103 |
| 2010/0118323 | A1 | * | 5/2010 | Horikawa ..................... | 358/1.11 |

FOREIGN PATENT DOCUMENTS

| JP | 6505817 A | 6/1994 |
|---|---|---|
| JP | 10063867 A | 3/1998 |
| JP | 2005-070957 A | 3/2005 |
| JP | 2009098862 A | 5/2009 |

OTHER PUBLICATIONS

"Adobe Portable Documents Format Version 1.3", PDF Reference second edition, ISBNO-201-61588-6, Published Jul. 2000, pp. i,ii,120-122,147-153,377-381, Publisher: Pearson Education.*
"Adobe Portable Documents Format Version 1.3", PDF Reference second edition, ISBNO-201-61588-6, Published Jul. 2000, pp. 135-136, 140-141, Publisher: Pearson Education.

(Continued)

*Primary Examiner* — Cesar B. Paula
*Assistant Examiner* — Nathan Hillery
(74) *Attorney, Agent, or Firm* — Sughrue Mion, PLLC

(57) ABSTRACT

It is confirmed whether or not page description data contain an object for stroking a path. If the page description data contain the object for stroking a path, then it is confirmed whether or not a curved path construction operator is contained in the object. If the curved path construction operator is contained in the object, line segments of a polygonal path which is approximated to a curved path of the curved path construction operator are determined, and the curved path construction operator is replaced with a plurality of straight path construction operators which correspond respectively to the line segments of the polygonal path.

4 Claims, 8 Drawing Sheets

(56) References Cited

OTHER PUBLICATIONS

Rejection of the Application, dated Jul. 30, 2013, issued in corresponding JP Application No. 2009-270710, 6 pages in English and Japanese.

PostScript Language Reference Manual, Second Edition, Adobe Systems Incorporated, published Dec. 21, 1991, first edition, pp. 167 to 174, p. 482, p. 586, and pp. 593 to 596 and the English version of the pertinent portions.

* cited by examiner

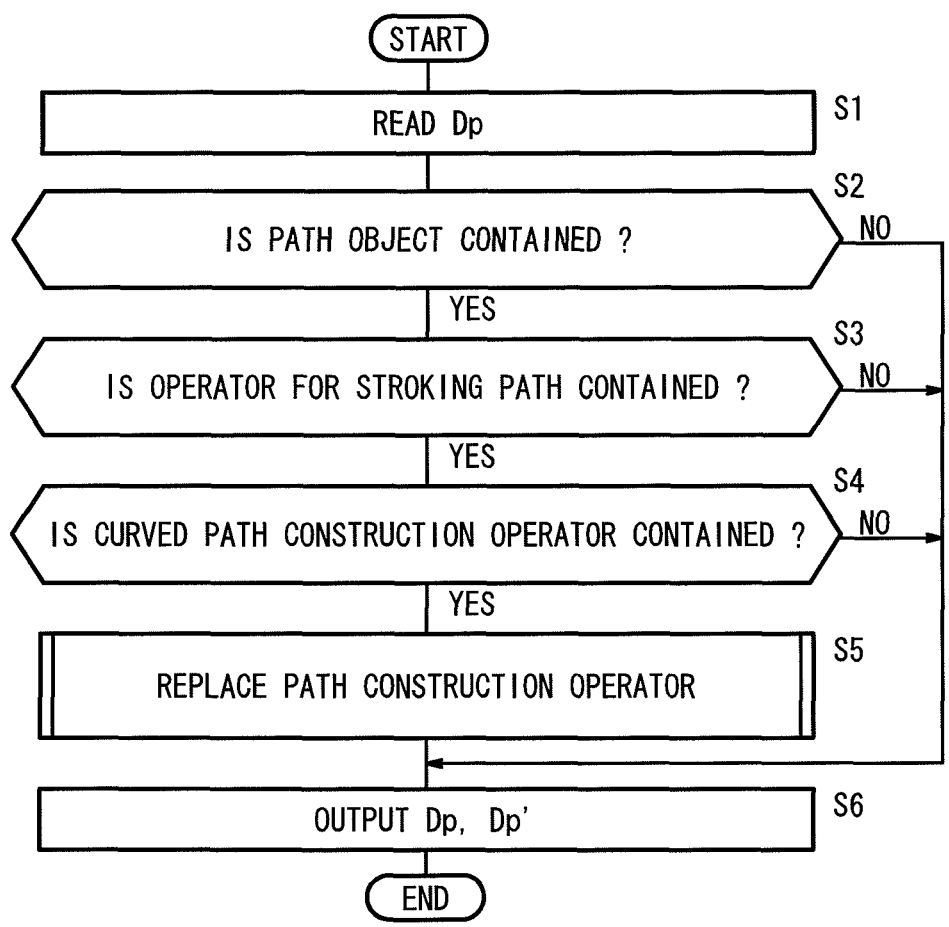

FIG. 5

```
         START  S5
           │
           ▼
    ┌──────────────┐
    │ flag=0       │ S51
    │ n=0          │
    │ tₙ=0         │
    └──────────────┘
           │
           ▼◄─────────────────────────────┐
      ╱ S52  ╲                            │
   YES╱ flag=0 ╲NO                        │
  ┌──╱          ╲──┐                      │
  ▼               ▼                       │
┌────────┐   ┌──────────┐                 │
│Δt=0.1  │S53│ Δt=Δt/2  │S54              │
└────────┘   └──────────┘                 │
     │            │                       │
     └─────┬──────┘                       │
           ▼                              │
    ┌─────────────────────┐               │
    │ A=y(tₙ)+y'(tₙ)Δt    │ S55           │
    │ B=y(tₙ+Δt)          │               │
    └─────────────────────┘               │
           │                              │
           ▼                              │
      ╱ S56   ╲                           │
   YES╱|A-B|<Err╲NO                       │
  ┌──╱           ╲──┐                     │
  ▼                ▼                      │
┌────────┐     ┌────────┐                 │
│flag=0  │S57  │flag=1  │S58              │
└────────┘     └────────┘                 │
     │              │                     │
     │              └─────────────────────┤
     ▼                                    │
  ╱ S59    ╲                              │
YES╱tₙ+Δt≥1 ╲NO                           │
┌──╱         ╲──┐                         │
▼              ▼                          │
┌────────┐  ┌──────────────┐              │
│tₙ=1    │  │tₙ₊₁=tₙ+Δt    │S60           │
│M=n+1   │S61│n=n+1        │──────────────┘
└────────┘  └──────────────┘
     │
     ▼
┌─────────────────────────────────────────────────┐
│ CALCULATE M CURRENT POINTS Cₙ (xₙ, yₙ)          │ S62
└─────────────────────────────────────────────────┘
     │
     ▼
┌─────────────────────────────────────────────────┐
│ GENERATE GROUP OF STRAIGHT PATH CONSTRUCTION    │ S63
│ OPERATORS AND REPLACE CURVED PATH CONSTRUCTION  │
│ OPERATOR WITH GROUP OF STRAIGHT PATH            │
│ CONSTRUCTION OPERATORS                          │
└─────────────────────────────────────────────────┘
     │
     ▼
   END
```

(COMPARATIVE EXAMPLE)

(COMPARATIVE EXAMPLE)

PAGE DESCRIPTION DATA PROCESSING APPARATUS, PAGE DESCRIPTION DATA PROCESSING METHOD, AND RECORDING MEDIUM

CROSS-REFERENCE TO RELATED APPLICATION

This application is based upon and claims the benefit of priority from Japanese Patent Application No. 2009-270710 filed on Nov. 27, 2009, of which the contents are incorporated herein by reference.

BACKGROUND OF THE INVENTION

1. Field of the Invention

The present invention relates to a page description data processing apparatus, a page description data processing method, and a recording medium for performing a particular processing sequence on page description data described by a page description language (PDL), thereby to convert the page description data into more robust page description data (hereinafter referred to as "robustized page description data").

2. Description of the Related Art

In recent years, DTP processes for setting characters and images generated by the operator with a computer into an electronic page using DTP (DeskTop Publishing) application software installed in the computer have been widely used in the printing and platemaking fields.

The DTP application software generates page description data which express images of respective pages based on elements such as characters and images edited by the operator.

The page description data are vector data independent of the resolution of an output machine such as a printer, a platesetter, or the like, and cannot be output per se from the output machine. Therefore, the page description data are rasterized by an RIP (Raster Image Processor) into raster image data comprising a cluster of dots representative of elements such as characters and images in pages.

When the raster image data are supplied to the output machine such as a printer, a platesetter, or the like, the output machine outputs a hard copy or a printing plate carrying an image based on the raster image data (see Japanese Laid-Open Patent Publication No. 2005-070957).

PDF (Portable Document File) version 1.3, which is one type of page description data, incorporates a plurality of processing schemes (hereinafter referred to as "line join styles") that are applied to joints in stroking a plurality of connected paths. The term "path" refers to a path which has no line width by itself and which interconnects a start point and an end point. The term "stroke" refers to a process of applying a certain line width to a path.

Of the line join styles incorporated in PDF version 1.3, "miter join" is a process of extending the outer edges of two line segments until they meet at a certain angle, as in a picture frame. Another line join style called "bevel join" is a process of squaring off the end points of two line segments and filling a space defined jointly by the square ends with a triangle. For details, reference should be made to PDF Reference, 2nd edition, Adobe Portable Document Format Version 1.3, 1st edition, 1st print, published July 2000, Author: Adobe Systems, Publisher: Pearson Education, ISBN0-201-61588-6, pages 135-136, 140-141.

According to the PDF specifications, it is prescribed that if the angle at which two line segments cross each other is equal to or greater than a certain value (miter limit), then the miter join is applied, and if the angle is smaller than the miter limit, the bevel join is applied. Therefore, if the line segments cross each other at an acute angle, then the corner formed by the crossing line segments is squared off to prevent itself from protruding excessively, with the result that they have an improved image quality, particularly if they produce a character image.

However, even the PDF specifications are susceptible to an unexpected problem which is experienced in a process of rasterizing a line shape that is made up, as shown in FIG. 8A of the accompanying drawings, of a curved path $P_C$ having a start point $A_1$ and an end point $A_2$ and a straight path $P_L$ having a start point $A_2$ and an end point $A_3$. The problem will be described below while the rasterizing process will be explained.

As shown in FIG. 8B of the accompanying drawings, an object $O_C$ (see FIG. 8A) strokes the curved path $P_C$ (indicated by the solid line in FIG. 8A), and an RIP approximates the curved path $P_C$ with a polygonal path $P_{L1}$ (indicated by the broken line in FIG. 8B), made up of a plurality of line segments. The approximated result depends on the characteristics inherent in the output machine, such as an output resolution thereof, and the software version of the RIP. In FIG. 8B, the curved path $P_C$ comprises a curve $A_1A_2$ divided into two line segments by a joint $J_1$.

Then, the shapes of the outer edges of line segments having a certain line width are determined along and over a central line that is represented by the polygonal path $P_{L1}$. The angle $\angle J_1A_2A_3$ formed between a line segment $J_1A_2$ and a line segment $A_2A_3$ varies depending on the position of the joint $J_1$ that has been determined by the above approximation. Consequently, it is impossible to predict which one of the miter join and the bevel join is to be applied as the line join style at the point $A_2$.

If the angle $\angle J_1A_2A_3$ in FIG. 8B is smaller than the miter limit, then the corner of the point $A_2$ is processed into a bevel join, as shown in FIG. 8C. As a result, a stroked area 4 is produced which is devoid of an apex (cut-off area 2) at the corner of the point $A_2$.

In FIG. 8D of the accompanying drawings, the curve $A_1A_2$ is divided into three line segments by joints $J_2$, $J_3$, and is approximated by a polygonal path $P_{L2}$, indicated by the broken line.

The angle $\angle J_3A_2A_3$ between a line segment $J_3A_2$ and a line segment $A_2A_3$ shown in FIG. 8D is greater than the angle $\angle J_1A_2A_3$ shown in FIG. 8B. If the angle $\angle J_3A_2A_3$ is equal to or greater than the miter limit, then the corner of the point $A_2$ is processed into a miter join, as shown in FIG. 8E of the accompanying drawings. As a result, a stroked area 6 is produced which has an apex at the corner of the point $A_2$.

As shown in FIGS. 8B and 8D, since the angle at which the curved path $P_C$ and straight path $P_L$ join each other varies depending on the number of line segments into which the curve $A_1A_2$ is divided, the cut-off area 2 (see FIG. 8C) may be irregularly produced. The same phenomenon may occur with respect to a line shape that is made up of joined objects each stroking a curved path.

As described above, when curved paths are approximated by polygonal paths depending on the characteristics inherent in the output machine, such as an output resolution thereof, and the software version of the RIP, since the angle at which the paths join each other is indefinite, they may be converted into an unexpected stroked shape. Accordingly, when image data representing a precipitous line shape are rasterized, the rasterized image data may possibly lead to unexpected print difficulties whose causes are difficult to identify.

SUMMARY OF THE INVENTION

It is an object of the present invention to provide a page description data processing apparatus, a page description data processing method, and a recording medium which make it possible to prevent print difficulties from occurring in a process of rasterizing image data representing a precipitous line shape.

A page description data processing apparatus, a page description data processing method and a recording medium according to the present invention operate by confirming whether or not page description data contain an object for stroking a path or not, confirming whether or not a curved path construction operator is contained in the object, if the page description data contain the object for stroking a path, and determining line segments of a polygonal path which is approximated to a curved path of the curved path construction operator and replacing the curved path construction operator with a plurality of straight path construction operators which correspond respectively to the line segments of the polygonal path, if the curved path construction operator is contained in the object. In this way, page description data is converted into more robust page description data (referred to as "robustized page description data").

Preferably, upon replacing the curved path construction operator, the line segments of the polygonal path are determined such that an approximation error with respect to the curved path falls within a predetermined range.

Since the curved path construction operator is replaced with the straight path construction operators which correspond respectively to the line segments of the polygonal path, no calculation process is carried out to approximate a curved path by a polygonal path in a rasterizing process carried out by an RIP. Therefore, it is possible to prevent the angle at which paths join each other from becoming indefinite in the page description data. The page description data are thus prevented from leading to print difficulties in a process of rasterizing image data representing a precipitous line shape.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a flow chart of an operation sequence of the page description data processing apparatus shown in FIG. 2;

FIG. 5 is a flow chart of a process of replacing a path construction operator;

DESCRIPTION OF THE PREFERRED EMBODIMENTS

A publishing system which incorporates a page description data processing apparatus, a page description data processing method, and a recording medium according to an embodiment of the present invention will be described in detail below with reference to the accompanying drawings.

Figure 1:
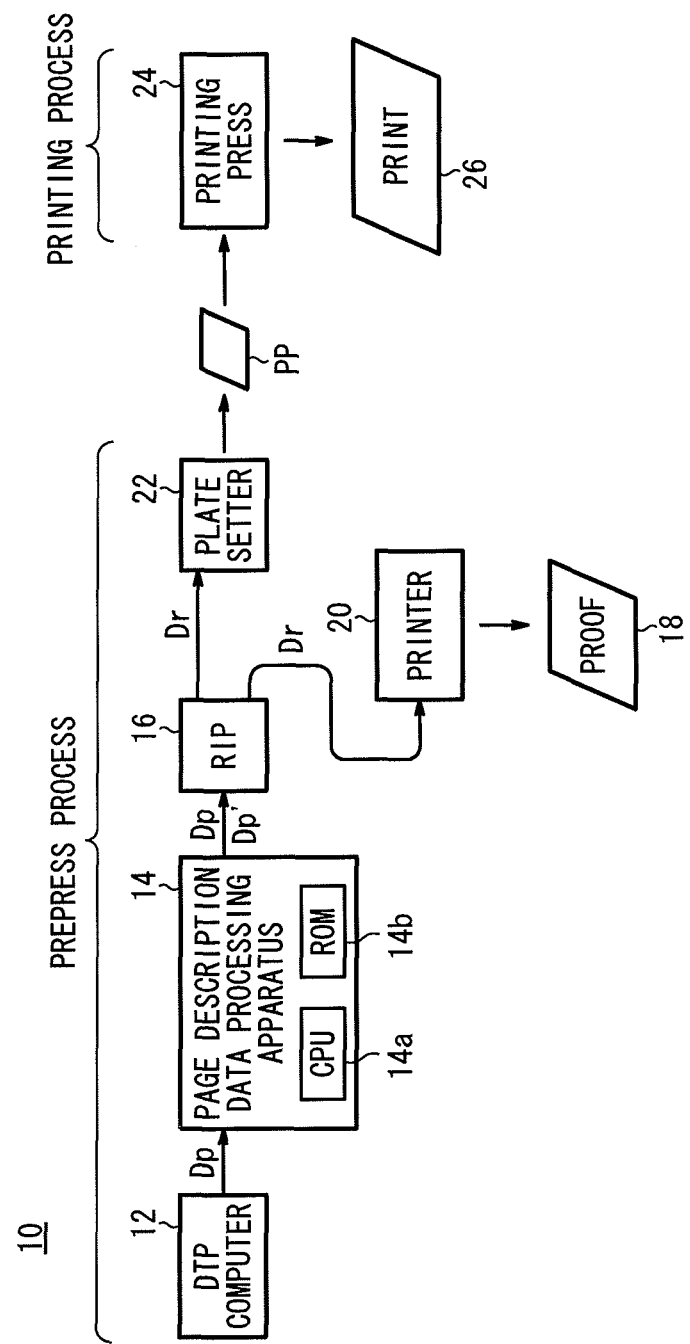
FIG. 1 is a block diagram of an entire publishing system according to an embodiment of the present invention.

FIG. 1 is a block diagram of an entire publishing system 10 according to an embodiment of the present invention.

The publishing system 10 is arranged to perform a prepress process, a printing process, and a bookbinding process (not shown).

The prepress process includes a DTP computer 12, a page description data processing apparatus 14 such as a personal computer or the like, an RIP 16, a printer 20, and a platesetter 22.

The DTP computer 12 generates page description data Dp which express images of respective pages based on elements such as characters and images edited by the operator.

The page description data processing apparatus 14 checks the contents (attributes) of the page description data Dp output from the DTP computer 12, performs a particular processing sequence on the page description data Dp having a certain attribute based on the checked contents, and generates the processed page description data Dp as robustized page description data Dp' or outputs page description data Dp free of the certain attribute. The processing function of the page description data processing apparatus 14 may be incorporated in the DTP computer 12, so that the page description data processing apparatus 14 can be dispensed with.

The RIP 16 converts the page description data Dp or the robustized page description data Dp' output from the page description data processing apparatus 14 into raster image data Dr in C, M, Y, K.

Based on the raster image data Dr, the printer 20 prints a proof 18 as a hard copy.

If the proof 18 printed by the printer 20 is judged as acceptable by the operator, then the platesetter 22 generates and outputs printing plates PP in C, M, Y, K from the raster image data Dr output from the RIP 16 after the operator has turned on the start switch of the platesetter 22.

The printing process includes a printing press 24. The printing press 24 has printing plates PP in C, M, Y, K mounted therein which carry respective inks in C, M, Y, K and transfer them to a sheet of paper, thereby producing a print 26 in multiple colors (four colors).

Figure 2:
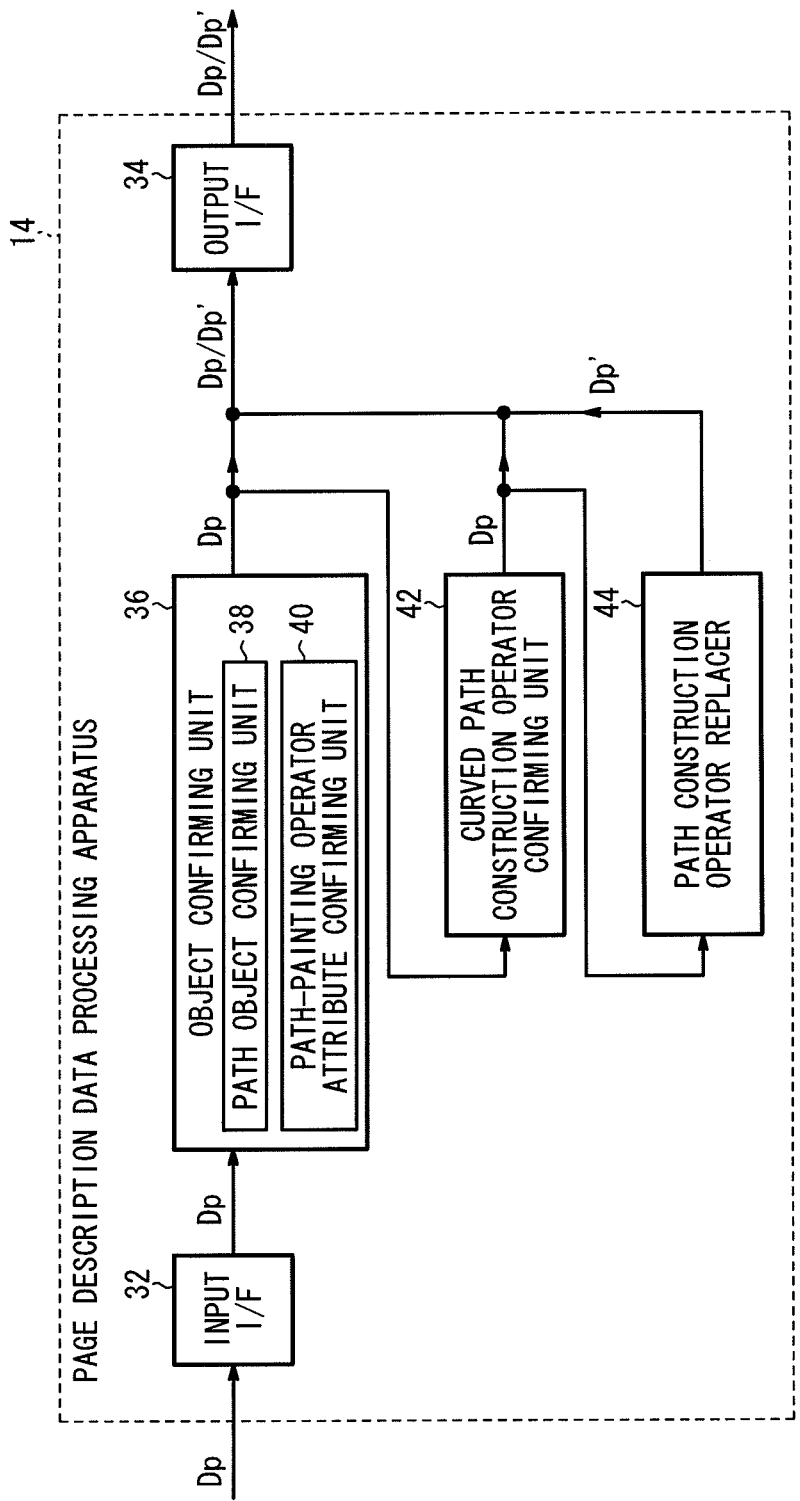
FIG. 2 is a functional block diagram of a page description data processing apparatus of the publishing system shown in FIG. 1.

FIG. 2 is a functional block diagram of the page description data processing apparatus 14. The page description data processing apparatus 14 has functions that are performed when a CPU 14a (see FIG. 1) thereof executes a program stored in a ROM 14b (see FIG. 1) thereof.

The program may be recorded in a computer-readable recording medium such as the ROM 14b, a hard disk, a CD-ROM or the like, and the program recorded in the recording medium may be read and run by a computer system. The computer system includes an OS and hardware such as a CPU and peripheral devices. The computer-readable recording medium also includes a medium for dynamically holding programs for a short period of time, such as a communication line for transmitting programs via a network such as the Internet or the like or a communication channel such as a telephone line, or a memory for holding programs for a certain period of time such as a volatile memory in a computer system which serves as a server or a client in a network environment.

The page description data processing apparatus 14 generates robustized page description data Dp' by analyzing page description data Dp supplied via an input interface (input I/F) 32 or generates unchanged page description data Dp, and outputs the robustized page description data Dp' or the unchanged page description data Dp via an output interface (output I/F) 34.

The page description data processing apparatus 14 comprises, in addition to the input and output interfaces 32, 34, an object confirming unit 36 involved in the analyzing process, a curved path construction operator confirming unit 42, and a path construction operator replacer 44, as its functions. The object confirming unit 36 comprises a structural analyzer, not shown, a path object confirming unit 38, and a path-painting operator attribute confirming unit 40.

The term "path object" used herein refers to an arbitrary shape made up of a straight line, a rectangle, and a curve, e.g., a cubic Bezier curve.

The term "path-painting operator" used herein refers to an operator for ending a path object, having an attribute as either an operator for applying a line width to a current path to paint a line (hereinafter referred to as "stroking operator" for illustrative purposes) or an operator for filling a closed space generated by a current path (hereinafter referred to as "filling operator" for illustrative purposes).

The term "path construction operator" used herein refers to an operator for defining the physical shape of a path. According to the PDF, there are defined seven operators "m", "l", "c", "v", "y", "h", and "re".

The term "curved path construction operator" used herein refers to an operator for adding a curve to a current path, among the path construction operators. According to the PDF, there are defined three operators "c", "v", and "y", each for adding a cubic Bezier curve.

The term "straight path construction operator" used herein refers to an operator for adding a straight line to a current path, among the path construction operators. According to the PDF, there is defined one operator "l".

Figure 3:
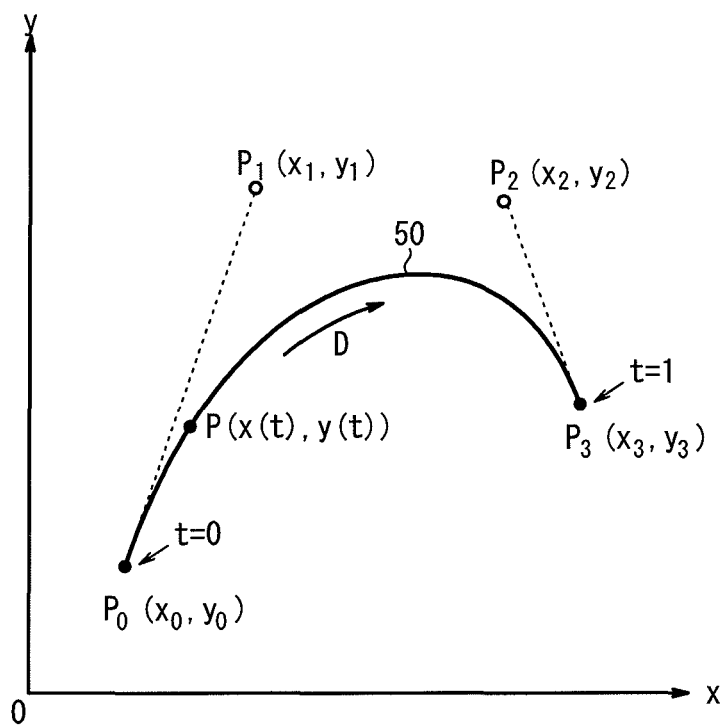
FIG. 3 is a diagram showing a path represented by a cubic Bezier curve that is generated by a curve stroke operator.

FIG. 3 is a diagram showing a cubic Bezier curve that is generated by the operator "c". The cubic Bezier curve, denoted by 50 in FIG. 3, is defined by two terminal points, i.e., start and end points, $P_0$ ($x_0$, $y_0$), $P_3$ ($x_3$, $y_3$) and two control points $P_1$ ($x_1$, $y_1$), $P_2$ ($x_2$, $y_2$).

The cubic Bezier curve 50 is represented by coordinates P(x(t), y(t)) where t is a variable, and is generated between the start point $P_0$ and the end point $P_3$ by varying the variable "t" from 0 to 1. The coordinates P(x(t), y(t)) of a point P on the curve 50 are calculated by the following expressions (1), (2):

$$x(t)=(1-t)^3 x_0 + 3t(1-t)^2 x_1 + 3t^2(1-t)x_2 + t^3 x_3 \quad (1)$$

$$y(t)=(1-t)^3 y_0 + 3t(1-t)^2 y_1 + 3t^2(1-t)y_2 + t^3 y_3 \quad (2)$$

Since $x(0)=x_0$, $y(0)=y_0$, $x(1)=x_3$, and $y(1)=y_3$ from the equations (1), (2), when the variable "t" changes from 0 to 1, the point P on the cubic Bezier curve 50 moves continuously from the start point $P_0$ to the end point $P_3$ along the direction indicated by the arrow D. A line segment $P_0 P_1$ indicated by the broken line is a line tangential to the cubic Bezier curve 50 at the start point $P_0$, and a line segment $P_2 P_3$ indicated by the broken line is a line tangential to the cubic Bezier curve 50 at the end point $P_3$.

The publishing system 10 is basically constructed as described above. Operation of the page description data processing apparatus 14 of the publishing system 10 will be described below with reference to a flowchart shown in FIG. 4.

In step S1 shown in FIG. 4, the page description data processing apparatus 14 reads page description data Dp, page by page, which are output from the DTP computer 12.

In step S2, the structural analyzer, not shown, analyzes the structure of the page description data Dp and extracts an object contained in the pages. Thereafter, the path object confirming unit 38 confirms whether a path object is contained in the extracted object or not. If a path object is not contained in the extracted object, then the path object confirming unit 38 outputs the page description data Dp unchanged via the output interface 34 in step S6.

If a path object is contained in the extracted object, then the path-painting operator attribute confirming unit 40 confirms whether a stroking operator, e.g., an operator "S", "s" or the like, is contained in the path object or not in step S3. If a stroking operator is not contained in the path object, or in other words, if a filling operator "f", "F" or the like, is contained in the path object, then the path-painting operator attribute confirming unit 40 outputs the page description data Dp unchanged via the output interface 34 in step S6.

If a stroking operator is contained in the path object, then the curved path construction operator confirming unit 42 confirms whether a curved path construction operator, e.g., an operator "c", "v" or "y", is contained in the path object or not in step S4. If a curved path construction operator is not contained in the path object, or in other words, if only an operator "m", "l", "h" or "re" is contained in the path object, then the curved path construction operator confirming unit 42 outputs the page description data Dp unchanged via the output interface 34 in step S6.

If a curved path construction operator is contained in the path object, then the path construction operator replacer 44 replaces the curved path construction operator with a plurality of straight path construction operators by which the curved path construction operator is approximated, in step S5. Then, in step S6, the path construction operator replacer 44 outputs page description data Dp' where the curved path construction operator has been replaced with the straight path construction operators, via the output interface 34.

In this manner, the page description data Dp that are supplied to the page description data processing apparatus 14 are supplied as the unchanged page description data Dp or the page description data Dp' where the curved path construction operator has been replaced with the straight path construction operators, to the RIP 16, as shown in FIG. 1.

A process of replacing a path construction operator (step S5 in FIG. 4) will be described in detail below with reference to a flowchart shown in FIG. 5. The process shown in FIG. 5 is carried out by the path construction operator replacer 44.

First, variables are initialized. Specifically, a flag whose value is either 0 or 1, a variable n whose value is a nonnegative integer, and a variable $t_n$ whose value is a real number ranging from 0 to 1, are set to 0 in step S51. The variables will be described later on when necessary.

Then, it is determined whether the flag is 0 or not in step S52. Since the flag is 0 initially, Δt is set to 0.1 in step S53. The initial value of Δt is not limited to 0.1, but may be a suitable value for subsequent calculations to be described below.

If the flag is 1, Δt is set to Δt/2 in step S54 as will be described in detail later.

Then, values of A, B are calculated according to predetermined expressions in step S55. The meanings of A, B will be described below with reference to FIG. 6.

Figure 6:
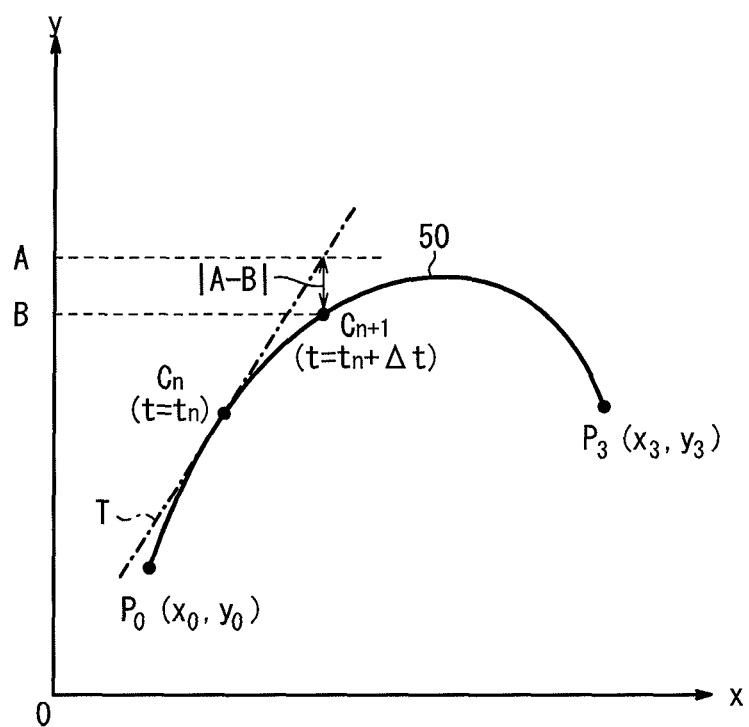
FIG. 6 is a diagram illustrative of a process of determining a polygonal path which is approximated to a path represented by a cubic Bezier curve.

FIG. 6 is a diagram illustrative of a process of determining a polygonal path which is approximated to a path represented by the cubic Bezier curve 50 shown in FIG. 3.

In FIG. 6, a straight line T indicated by the broken line is a line tangential to the cubic Bezier curve 50 at a point $C_n$ (t=$t_n$) thereon. Using y(t) according to the expression (2), the gradient of the straight line T is expressed as y'($t_n$). The value of y at a point $C_{n+1}$(t=$t_n$+Δt) can thus be linearly approximated by $A=y(t_n)+y'(t_n)\Delta t$. The actual value of y at a point $C_{n+1}$ ($t=t_n+\Delta t$) is represented by $B=y(t_n+\Delta t)$.

The value $|A-B|$ means an approximation error that is produced when the cubic Bezier curve 50 is linearly approximated by the straight line T which passes through the point $C_n$.

Then, it is determined whether $|A-B|<$Err (allowable error) is satisfied or not in step S56. If the approximation error $|A-B|$ is smaller than the allowable error Err, then the flag is set to 0 in step S57. The allowable error Err may be set depending on the accuracy with which an image is reproduced. If the print 26 is produced by the printing press 24 which has a resolution of 2400 dpi, then it is preferable to set the allowable error Err to a value equal to or smaller than a pixel size which corresponds to 1200 dpi, which is one-half of the resolution of 2400 dpi. In this manner, the process shown in FIG. 5 can be appropriately performed depending on the output resolution of the printing press 24.

If the approximation error $|A-B|$ is equal to or greater than the allowable error Err, then the flag is set to 1 in step S58, and control goes back to step S52. Since the flag has been set to 1, $\Delta t$ is reset to $\Delta t/2$ in step S54, so that the approximating range based on the straight line T (see FIG. 6) is reduce to half. In this fashion, steps S52 through S56 are repeated to gradually reduce the approximating range based on the straight line T until the approximation error $|A-B|$ becomes smaller than the allowable error Err.

It is preferable to keep the approximation error within a predetermined range for stably maintaining the quality of images such as character images.

If the approximation error $|A-B|$ is smaller than the allowable error Err (i.e., $|A-B|<$Err), the flag is set to 0 in step S57. Thereafter, it is determined whether $t_n+\Delta t \geq 1$ is satisfied or not in step S59. If $t_n+\Delta t \geq 1$ is not satisfied, i.e., if $t_n+\Delta t<1$, then it is judged that the process of dividing the cubic Bezier curve 50 into line segments of a polygonal path is not completed yet. Thereafter, a current point, i.e., a joint between line segments, is set ($t_{n+1}=t_n+\Delta t$), and a next current point (n=n+1) is searched for in step S60. Thereafter, control goes back to step S52, and steps S52 through S60 are repeated.

If $t_n+\Delta t \geq 1$ is satisfied, then it is judged that the process of dividing the cubic Bezier curve 50 into line segments of a polygonal path is completed over the interval of $0 \leq t \leq 1$. Thereafter, an end point ($t_n=1$) is determined, and the number M (=n+1) of current points is stored in step s61.

Then, the M current points $\{C_m\}$ (m=0 through M−1) are calculated in step S62. The coordinates (x, y) of the M current points can be calculated according to the expressions (1), (2).

Finally, a group of straight path construction operators is generated, and then the curved path construction operator is replaced with the group of straight path construction operators in step S63. More specifically, (M−1) straight path construction operators having start points $C_m$ and end points $C_{m+1}$ are generated. Thereafter, the single curved path construction operator is replaced with the (M−1) straight path construction operators (operator "l"). The process is thus ended.

Figure 7A:
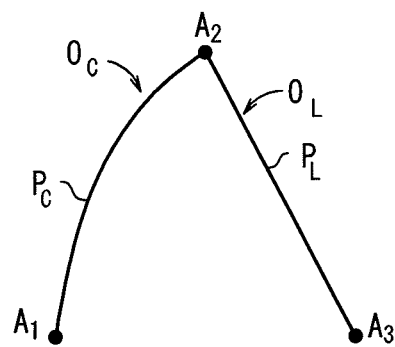
FIGS. 7A through 7C are diagrams illustrative of a rasterizing process according to the embodiment of the present invention.
Figure 7B:
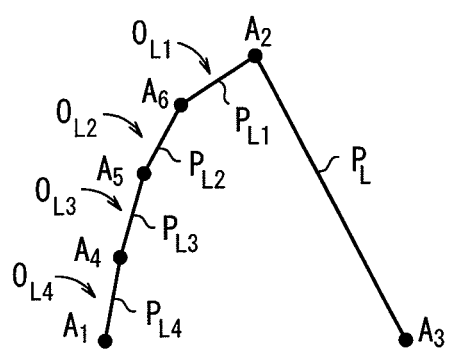
Figure 8A:
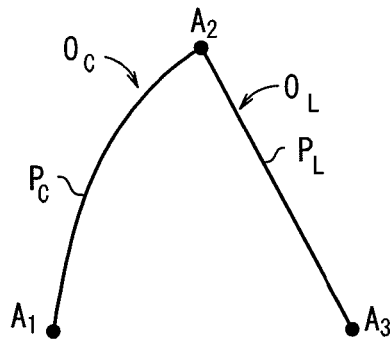
FIGS. 8A through 8E are diagrams illustrative of a rasterizing process according to a comparative example.
Figure 8B:
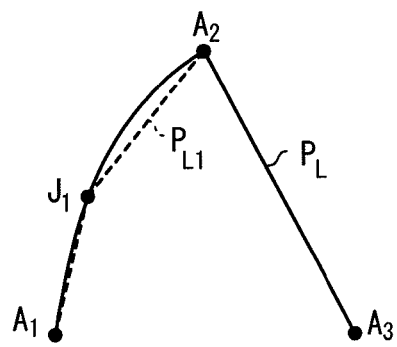

FIG. 7A shows a path having a line shape which is the same as the line shape shown in FIG. 8A. FIG. 7B shows a polygonal path converted from the path shown in FIG. 7A by a page description data processing method according to the present embodiment.

As shown in FIG. 7B, a curved path $P_C$ (curved path construction operator $O_C$) is replaced with line segments $P_{L1}$ through $P_{L4}$ of a polygonal path which correspond respectively to straight path construction operators $O_{L1}$ through $O_{L4}$. The line segments $P_{L1}$ through $P_{L4}$ of the polygonal path reproduce the curved path $P_C$ with accuracy.

Figure 7C:
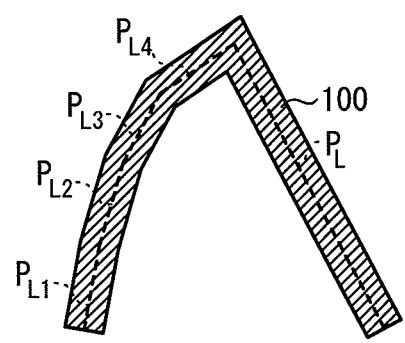

FIG. 7C shows a stroked area 100 produced when the line segments $P_{L1}$ through $P_{L4}$ of the polygonal path shown in FIG. 7B are rasterized by the RIP 16.

Figure 8C:
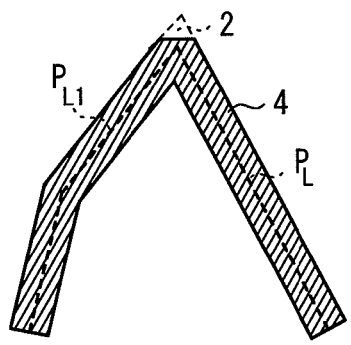
Figure 8D:
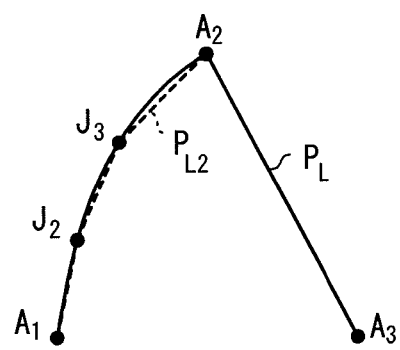
Figure 8E:
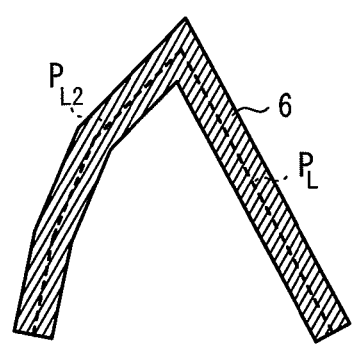

As shown in FIG. 7C, the stroked area 100 is expressed more stably than the stroked areas 4, 6 (see FIGS. 8C and 8E). As no curved path construction operator is present in the object, the stroked area 100 is completely free of any line join style instability caused by the rasterizing process.

As described above, immediately before the page description data are rasterized by the RIP 16, the curved path $P_C$ is replaced with the line segments $P_{L1}$ through $P_{L4}$ of the polygonal path. Thus, the page description data are prevented from leading to print difficulties due to the characteristics inherent in the printing press 24, the software version of the RIP 16, etc. Thus, possible print difficulties in a process of rasterizing image data representing a precipitous sharp line shape can be prevented. The present invention is particularly effective in outlining fonts.

While the page description data according to the PDF have been described above, the present invention is not limited to the PDF, but is also applicable to other page description languages such as PostScript (registered trademark) of Adobe Systems and XPS (XML Paper Specification).

Although a certain preferred embodiment of the present invention has been shown and described in detail, it should be understood that various changes and modifications may be made therein without departing from the scope of the appended claims.

What is claimed is:

1. A page description data processing apparatus comprising:
    an input interface configured to input page description data to be supplied to a printing press;
    an object computing unit including a structural analyzer for extracting an object in the page description data;
    an object path computing unit connected to receive a result from the object computing unit, and configured to confirm whether or not the page description data contain an object for stroking a path by determining presence or absence of data representing a stroking operator in the page description data;
    a curved path computing unit connected to receive a result from the object path computing unit when it is determined that the page description data contains the object for stroking a path, and configured to confirm whether or not a curved path construction operator corresponding to a curved path is contained in the object by determining presence or absence of data representing an operator representing a type of curve in the page description data; and
    a path construction operator replacement computing unit connected to receive a result from the curved path computing unit when it is determined that curved path computing unit confirms the curved path construction operator, and configured to determine line segments of a polygonal path which is approximated to the curved path of the curved path construction operator and replacing the curved path construction operator with a plurality of straight path construction operators which correspond respectively to the line segments of the polygonal path, wherein the path construction operator replacement unit determines the line segments of the polygonal path such that an approximation error with respect to the curved path falls within a predetermined range set depending on output resolution of the printing press, wherein the line segments are determined in a serial manner, and the spacing of the line segments is variable, said curved path construction operator determines the spacing based on an approximation difference between a value of respective straight path construction operator at a predetermined point and value of the curved path being approximated at the predetermined point; and further wherein in the path construction operator, the approximation difference is calculated reiteratively when the approximation difference is determined to be greater than a predetermined threshold, and when the approximation difference is greater than the predetermined threshold, the spacing of a next line segment approximation relative to a current line approximation becomes reduced for determining a next approximation difference until the approximation difference is less than the predetermined threshold, and an output interface configured to output robustized page description data having been subjected to the particular processing sequence by the object computing unit, the object path computing unit, the curved path computing unit, and path construction operator replacement unit.

2. A page description data processing method for using a page description data processing apparatus checking if page description data to be supplied to a printing press has a certain attribute and for performing a particular processing sequence on the page description data having the certain attribute, comprising:

using one or more processors to perform:

an object confirming step of executing the page description data processing apparatus to confirm whether or not the page description data contain an object for stroking a path by determining the presence or absence of data representing a stroking operator in the data description data;

an operator confirming step of executing the page description data processing apparatus to confirm whether or not a curved path construction operator corresponding to a curved path is contained in the object by determining presence or absence of data representing a curved path construction operator in the page description data, when the page description data contain the object for stroking a path; and an operator replacing step of executing the page description data processing apparatus to determine line segments of a polygonal path which is approximated to the curved path of the curved path construction operator and replace the curved path construction operator with a plurality of straight path construction operators which correspond respectively to the line segments of the polygonal path, when the curved path construction operator is contained in the object, wherein in the operator replacing step, the line segments of the polygonal path is determined such that an approximation error with respect to the curved path falls within a predetermined range set depending on output resolution of the printing press, wherein the line segments are determined in a serial manner, and the spacing of the line segments is variable, said curved path construction operator determines the spacing based on an approximation difference between a value of respective straight path construction operator at a predetermined point and value of the curved path being approximated at the predetermined point, wherein the approximation difference is calculated reiteratively when the approximation difference is determined to be greater than a predetermined threshold, and when the approximation difference is greater than the predetermined threshold, the spacing of a next line segment approximation relative to a current line approximation becomes reduced for determining a next approximation difference until the approximation difference is less than the predetermined threshold; and outputting a display result based on the aforesaid steps.

3. A non-transitory computer-readable recording medium storing a program for enabling a computer to check an attribute of page description data to be supplied to a printing press and perform a processing sequence on the page description data depending on the checked attribute, the program further enabling the computer to perform steps of:

object confirmation including confirming whether or not the page description data contain an object for stroking a path;

curved path construction operator confirmation including confirming whether or not a curved path construction operator corresponding to a curved path is contained in the object, in a case where the object confirmation step has confirmed the object; and path construction operator replacement including determining line segments of a polygonal path which is approximated to the curved path of the curved path construction operator and replacing the curved path construction operator with a plurality of straight path construction operators which correspond respectively to the line segments of the polygonal path, in a case where the curved path construction operator confirmation step has confirmed the curved path construction operator, wherein the path construction operator replacement determines the line segments of the polygonal path such that an approximation error with respect to the curved path falls within a predetermined range set depending on output resolution of the printing press, wherein the line segments are determined in a serial manner, and the spacing of the line segments is variable, said curved path construction operator determining the spacing based on an approximation difference between a value of respective straight path construction operator at a predetermined point and value of the curved path being approximated at the predetermined point, and wherein the approximation difference is calculated reiteratively when the approximation difference is determined to be greater than a predetermined threshold, and when the approximation difference is greater than the predetermined threshold, the spacing of a next line segment approximation relative to a current line approximation becomes reduced for determining a next approximation difference until the approximation difference is less than the predetermined threshold.

4. The apparatus according to claim 1, wherein the path construction operator replacement further determines whether a sufficient number of line segments for approximating the curve have been determined.

* * * * *